Dec. 10, 1957   A. BLANCHARD   2,816,009
WELL LOGGING METHOD AND APPARATUS
Filed Aug. 10, 1954
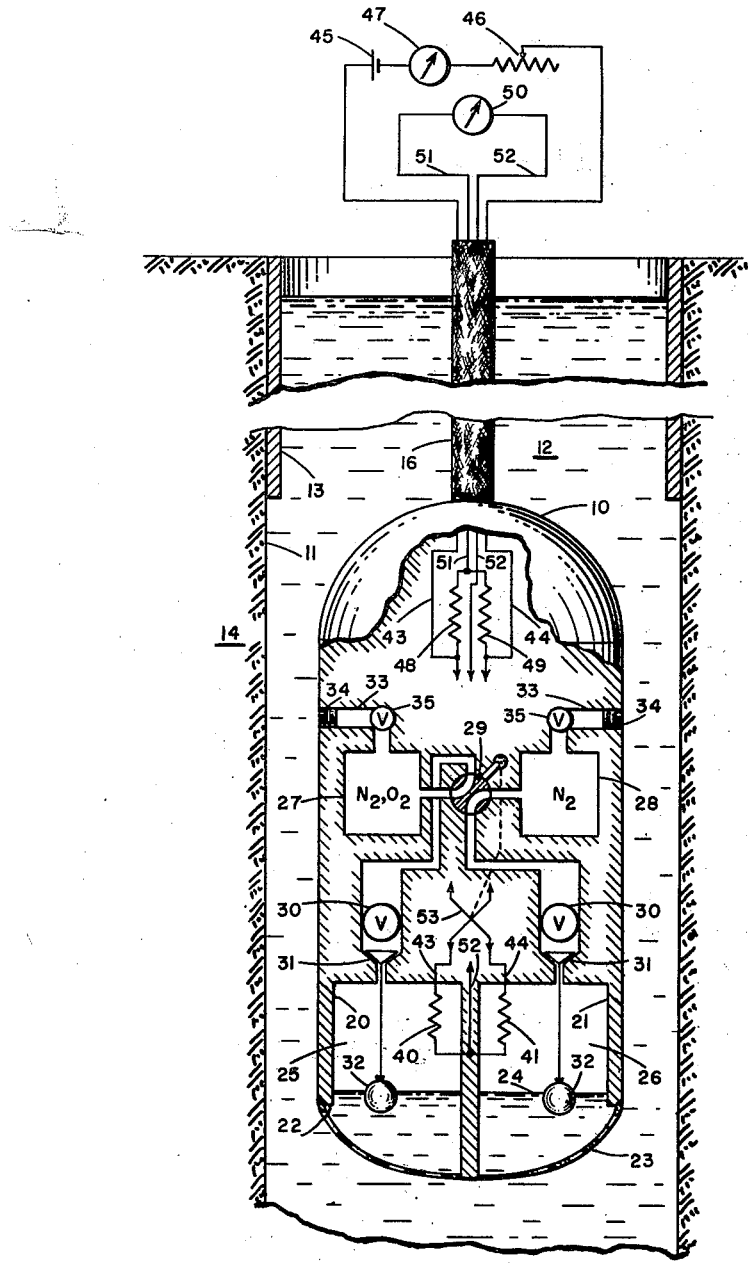
INVENTOR.
ANDRÉ BLANCHARD
BY *William R. Sherman*
HIS ATTORNEY United States Patent Office 2,816,009
Patented Dec. 10, 1957

2,816,009

WELL LOGGING METHOD AND APPARATUS

Andre Blanchard, Houston, Tex., assignor, by mesne assignments, to Schlumberger Well Surveying Corporation, Houston, Tex., a corporation of Texas Application August 10, 1954, Serial No. 448,909

16 Claims. (Cl. 23—230)

This invention relates to well logging methods and apparatus and, more particularly, to methods and apparatus for obtaining a continuous record of the occurrence of gas producing formations along a well.

To obtain a maximum recovery from the gas producing formations of a well, knowledge must be secured of the formation boundaries and preferably of the expectable rates of production, at least relatively among the formations of a given well. In the prior art, attempts have been made to secure information concerning the presence of gas producing formations during the course of drilling by analyzing the drilling fluid which is circulated through the well as it passes from the well to a reservoir. It is evident, however, that detection of gas at a point so remote from the producing horizons cannot be expected to provide accurate and detailed indications of either formation boundaries or relative rates of expected production.

Accordingly, it is an object of this invention to provide new and improved methods and apparatus for obtaining a record of the boundaries of gas producing formations along a well.

Another object of this invention is to provide reliable methods and apparatus for obtaining detailed and accurate records of gas formation boundaries together with an indication of the relative rates of expectable production from the formations encountered.

Yet another object of this invention is to provide new and improved methods and apparatus for obtaining such records by in situ measurements within a well.

These and other objects of the invention are attained, broadly speaking, by moving a bell-type chamber through drilling liquid within a well with the pressure in the chamber maintained to balance the hydrostatic pressure at successive levels in the well, allowing any hydrocarbons present in the drilling liquid to be evolved into such chamber, and recording their presence as the chamber moves past the producing formation. More specifically, a bell-type housing including both a combustion chamber and a reference chamber are provided with a combustion supporting gas introduced into the combustion chamber and an inert gas introduced into the reference chamber, each at a pressure sufficient to maintain a relatively constant liquid level in the chambers. Identical heating and temperature sensing filaments are disposed in each chamber and connected together in arms of a Wheatstone bridge circuit. To make this circuit accurately responsive to the presence of combustible hydrocarbons in the combustion chamber, the gases in the two chambers are substantially matched in thermal conductivity and have a low solubility to reduce their rate of flow through the chambers. Furthermore, to reduce the possibility of "zero drift" in the readings over a long period of time, provision is made for interchanging the functions of the chambers from run to run so that each may alternately be a reference chamber and a combustion chamber. During a given run, however, each chamber preferably serves only one function.

Other objects and advantages of the invention will be more clearly perceived from the following detailed description taken in conjunction with the drawing in which:

The drawing is a schematic elevational view of the apparatus in accordance with the invention disposed in a bore hole with a measuring station at the earth's surface.

In the drawing, a housing 10 is shown in a bore hole 11 adapted to be lowered through drilling liquid 12 beneath well casing 13 so as to traverse subterranean formations 14. As is conventional in the well logging art, the housing 10 is supported by a multiconductor electric cable 16 extending to the earth's surface for raising and lowering by the usual winch (not shown).

While the housing 10 may be moved upwardly or downwardly to obtain indications of the presence of hydrocarbons in the drilling liquid 12, pressures within the housing may more readily be regulated when the housing is moving in a downward direction through the bore hole 11. Accordingly, the bell-like housing 10 includes a pair of downwardly opening bell chambers 20 and 21 each having an ample area, at the level of their annular lower lip 22, for circulation of drilling liquid 12 into the bell chambers and out under the lip 22. A screen 23 is provided across the lip 22 of bell chambers 20 and 21 to exclude debris. So that gases and vapors may be retained in the bell chambers 20 and 21, the lip 22 is located somewhat below the desired liquid level 24 in the bell chambers. Above the liquid level 24, regions 25 and 26 associated respectively with the chambers 20 and 21 will remain filled with gases and vapors under a pressure sufficient to balance the hydrostatic pressure at the level 24.

Since the hydrostatic pressure at the level 24 will increase continuously as the housing is lowered through the drilling fluid 12, provision is made for increasing the gas pressure within the regions 25 and 26 commensurately. To this end, reservoirs 27 and 28 are provided communicating through a reversing valve 29 alternately with the regions 25 and 26 and constructed to hold gas under pressures in excess of any hydrostatic pressure which may be encountered during a particular run. Identical arrangements are preferably made to control the flow of gas from the reservoirs 27 and 28 comprising, for example, stopcocks 30 and poppet valves 31 operated by floats 32 immersed in the drilling fluid at the liquid level 24 for regulating the introduction of gases. Thus, if an increase in hydrostatic pressure causes the level 24 to rise in the chambers 20 and 21, the floats 32 will open both valves 31 to pass a sufficient amount of gas from each of the reservoirs 27 and 28 thereby to return the level 24 to its desired position, whence the valves 31 are again closed. The reservoirs 27 and 28 are arranged for separate filling through inlet conduits 33 closed at the outer surface of the housing 10 by plugs 34 and provided with stopcocks 35.

The drilling fluids which pass under the bell chambers 20 and 21 originally are composed of various ingredients such as clays suspended in a suitable vehicle. For the purposes of this invention, the conventional water vehicle or base is quite satisfactory. The atmosphere in the regions 25 and 26 above the drilling fluid will then be partially composed of water vapor. Additionally, slight amounts of carbon dioxide, oxygen and nitrogen may be evolved from the drilling liquid 12. If the bottom of the housing 10 is opposite a gas producing formation, hydrocarbons may be picked up by the drilling liquid which will be evolved at the liquid surface 24 into the regions 25 and 26 of the bell chambers. These gases and vapors, together with the gases supplied from the reservoirs 27 and 28, will each contribute partial pressures which together total a pressure equal to the hydrostatic pressure at the liquid level 24.

The presence of hydrocarbon vapors in the drilling liquid entering the bell chamber 20 is, according to the preferred embodiment of Fig. 1, detected by establishing a condition for combustion in only one of the chambers at a time, for example, chamber 20. As the oxygen evolved from drilling liquids is usually of an amount insufficient to support combustion of any hydrocarbon vapors present, additional oxygen is introduced from the reservoir 27 mixed in suitable proportions with an inert gas such as nitrogen. For example, the mixture in the reservoir 27 may comprise less than 20 percent oxygen and greater than 80 percent nitrogen, but the optimum mixture will depend upon the character of the drilling liquid and the type of hydrocarbons encountered. A combustible mixture is thus obtained in the chamber 20 whenever hydrocarbons are evolved from the drilling liquid. In the reference chamber 21, however, only an inert gas such as nitrogen is introduced from the reservoir 28 into the region 26. Accordingly, combustion is not to be expected in the region 26 and no augmentation of the temperature of this region 26 may be expected as a result of any combustion.

In order that the temperature conditions in the two chambers 20 and 21 may be substantially identical except for differences caused by combustion in one chamber or the other, it is preferable that the gases supplied from the reservoirs 27 and 28 have substantially the same thermal conductivity and also substantially the same low degree of solubility in the drilling liquid. With their properties thus matched, the gases will not tend to produce temperature differences on account of different rates of thermal conductivity or different rates of flow through the chambers into the drilling liquid in the absence of combustion. A low degree of solubility is also desirable to conserve the quantity of gases stored in the reservoirs, thus making possible the use of reservoirs of minimum size. These preferred conditions are obtained with the suggested nitrogen and nitrogen-oxygen supplies.

To initiate combustion in the chamber 20, a filament-type electrical resistance heating element 40 is disposed in the region 25. This resistance element 40 may be composed of a corrosion-resistant material such as platinum and will have an appreciable temperature coefficient such that the resistance value of the element 40 will be a measure of the temperature of the gases and vapors in the region 25. While this single resistance element 40 might be appropriately energized to obtain ignition temperatures and its resistance detected to determine temperature rise as a result of combustion in the chamber 20, a more selective detection of the presence of hydrocarbons in the region 25 may be accomplished by disposing a substantially identical resistance element 41 in the region 26 of the reference chamber 21. Both resistors 40 and 41 will then experience temperature variations common to both chambers. Only resistor 40, however, will experience a rise in temperature attributable to combustion of hydrocarbons, as combustion properly will not occur in the reference chamber 21.

Accordingly, resistors 40 and 41 are connected in an appropriate energizing and detecting circuit such as a Wheatstone bridge circuit shown in Fig. 1. In this circuit the resistors 40 and 41 are connected in series by conductors 43 and 44 across a controllable source of electric current, such as battery 45 and rheostat 46, with an ammeter 47 provided to facilitate manual regulation of the current supplied. Connected across the arms of the bridge similarly to the resistors 40 and 41 are resistors 48 and 49 substantially identical to one another. These latter resistors 48 and 49 are disposed within the housing 10 so as to experience the same temperatures and otherwise not to vary in resistance relative to one another. Across the bridge an indicating device 50, such as a galvanometer-type recorder, is connected by conductors 51 and 52.

As the subjection of one of the filament-type resistors to combustion over a period of time will change its resistance characteristics so as to produce a "zero drift" in the indicating device 50, the reversing valve 29 is manually or electrically operated periodically, such as after each run, to reverse the functions of the chambers 20 and 21 between service as a combustion chamber and service as a reference chamber. In this manner the identity of the resistive characteristics of resistors 40 and 41 may be preserved with the further benefit of increasing the life of those portions of the apparatus subjected to the combustion temperatures. If desired, the connections of the resistors 40 and 41 in the bridge circuit may be reversed in synchronism with the reversals of the valve 29 so that readings obtained on the indicating device 50 will have the same polarity regardless of which chamber is arranged for combustion.

For purposes of continuously logging the boundaries of gas producing formations as a function of depth of the housing in the bore hole, the indicating device 50 may have a conventional record advancing drive operating in synchronism with the movement of the housing in the bore hole. The speed of such movement may be adjusted so that a condition of equilibrium at each level is substantially achieved. Departures on the record from a zero reading will indicate the presence of gas producing formations, while the magnitude of the departure may provide a proportionate measure of the expectable rate of production from a given gas producing formation.

In utilizing the novel apparatus embodying this invention, the housing 10 is lowered into the bore hole 11 so that drilling liquid 12 moves relatively upwardly through the screen 23 into the bell chambers 20 and 21 and out under the lip 22. The drilling liquid entering the bell chambers 20 and 21 will evolve vapors and gases into regions 25 and 26, respectively, of the chambers 20 and 21 pressurized to maintain the liquid level 24 with gases of different ability to support combustion of hydrocarbon vapors.

When the housing is opposite the formations for which a record is to be secured, current is passed through the bridge circuit to provide a temperature in the chambers sufficient to initiate combustion. The temperature difference between chambers 20 and 21 will then be recorded by the indicating device 50, preferably as a function of the depth of the housing in the bore hole. By a suitable calibration, the record obtained may be scaled directly in proportions or quantities of hydrocarbons present in the drilling liquid, or alternatively the record obtained may be interpreted merely as indicating presence or absence of hydrocarbons at a given level in the bore hole. Should sufficient oxygen be evolved from drilling liquid in the reference chamber to support combustion, the intensity of the combustion which results will be so much less than the intensity of combustion in the combustion chamber that a temperature difference indicative of the presence of hydrocarbons will still be recorded.

It may be noted that as the hydrocarbon burns in the combustion chamber, the combustion products, such as carbon dioxide and water for example, will tend to dissolve in the drilling liquid and will automatically be replaced by a fresh supply of the mixture of nitrogen and oxygen.

In the event that no hydrocarbons are present in the drilling liquid at a particular level, the temperatures of the resistor elements 40 and 41 will depend somewhat on the thermal conductivity of the atmosphere in the regions 25 and 26, respectively. Since the conductivity of a mixture of nitrogen and oxygen is substantially identical to the conductivity of nitrogen alone, no appreciable difference in resistance values for the resistors 40 and 41 may be expected to result then from the thermal conductivities of the different gaseous compositions in the regions 25 and 26.

By reason of the matched compositions of the gases supplied to the chambers 20 and 21 and by reason also of the periodic reversal of valve 29 so that the chambers alternately serve as a reference chamber and a combustion chamber, the zero reading of the indicating device 50 may be obtained in the absence of hydrocarbons without being subject to drift or spurious effects. In this manner a false indication of the presence of a gas producing formation or a reduction in the sensitivity of the device is avoided.

It will be apparent that various modifications may be made in the preferred embodiment disclosed without departure from the principles of the invention. Thus, if it were desired to record the presence of hydrocarbons while the housing is being raised through the bore hole 11, provision could be made for allowing the pressurized atmospheres within the regions 25 and 26 to escape gradually in accordance with the decrease in hydrostatic pressure. This result might be obtained with the apparatus disclosed, in fact, by allowing the liquid level 24 to drop to the level of the lip 22, so that any excess gases and vapors might escape thereunder as the housing was raised in the bore hole. If desired, insulation might be provided in the partition between the chambers 20 and 21 to reduce the rate of heat transfer between these chambers, thereby to increase sensitivity in the detection of hydrocarbons.

These and other modifications lying within the true scope and spirit of the invention are intended to be included within the ambit of the appended claims.

I claim:

1. In well logging apparatus, a housing adapted to be moved through a well containing a liquid, said housing having a bell chamber open at the bottom, means maintaining a pressurized region within said bell chamber above the level of the liquid therein into which vapors of any hydrocarbons present in the liquid may evolve, and means in said pressurized region for detecting the presence of any hydrocarbon vapors in said region.

2. In well logging apparatus, a housing adapted to be lowered into a well containing drilling liquid, said housing having a bell chamber open at the bottom adapted to contain a gas under pressure which is combustible in the presence of hydrocarbon vapors, means in said chamber for initiating combustion, and means for detecting combustion in said chamber.

3. In well logging apparatus, a housing having a bell chamber open at the bottom and adapted to be lowered into a well containing drilling liquid, means for introducing gas under pressure into said bell chamber, said gas being combustible in the presence of hydrocarbon vapors, means for detecting combustion in said chamber when hydrocarbons are present in the drilling liquid, and means responsive to said detecting means for recording the presence of hydrocarbons as a function of the depth of the housing in the well.

4. In well logging apparatus, a housing having a bell chamber open at the bottom and adapted to be lowered into a well containing drilling liquid, means for introducing into said bell chamber under pressure a gas which is combustible in the presence of hydrocarbon vapors, means in said chamber for initiating combustion and detecting the same when hydrocarbon vapors are evolved from drilling liquid beneath said chamber, and means responsive to said detecting means for recording the presence of hydrocarbons as a function of depth of said housing in the well.

5. In well logging apparatus, a housing adapted to be moved through a well containing drilling liquid, said housing having a first bell chamber open at the bottom and adapted to contain a gas which is combustible in the presence of hydrocarbon vapors and a second bell chamber open at the bottom and adapted to contain a relatively inert gas, and means including temperature responsive means in each of said chambers for detecting combustion in said first chamber.

6. In well logging apparatus, a housing adapted to be lowered into a well containing drilling liquid, said housing having a first bell chamber open at the bottom and adapted to contain a gas which is combustible in the presence of hydrocarbon vapors and a second bell chamber open at the bottom and adapted to contain a relatively inert gas, temperature responsive means in each of said chambers and means for energizing said temperature responsive means to obtain an indication of any combustion in said first chamber.

7. In well logging apparatus, a housing adapted to be lowered into a well containing drilling liquid, said housing having a first bell chamber open at the bottom and adapted to contain a gas which is combustible in the presence of hydrocarbon vapors and a second bell chamber open at the bottom and adapted to contain a relatively inert gas, means for maintaining said gases under pressure to regulate the liquid level in said chambers, means including temperature responsive means in each of said chambers for detecting combustion in said first chamber, and means responsive to said detecting means for recording the presence of hydrocarbons in the drilling liquid as a function of depth in the well.

8. In well logging apparatus, a housing having first and second bell chambers open at the bottom and adapted to be lowered through a well containing drilling liquid, reversible means in said housing for connecting said first bell chamber with a supply of gas combustible in the presence of hydrocarbon vapors and connecting said second bell chamber to a supply of noncombustible gas, and means including temperature responsive means in each of said chambers for detecting combustion in one of said chambers.

9. In well logging apparatus, a housing having a pair of bell chambers open at the bottom and adapted to be lowered into a well containing drilling liquid, means in said housing for connecting said chambers alternately to a supply of gas combustible in the presence of hydrocarbon vapors and a supply of relatively inert gas respectively, electrical heating means in each of said chambers responsive to the temperature in the respective chambers and serving to initiate combustion in either of said chambers, and means associated with said electrical heating means for indicating the presence of hydrocarbons in the drilling liquid.

10. In well logging apparatus, a housing having first and second bell chambers open at the bottom and adapted to be lowered into a well containing drilling liquid, means in said housing for reversibly connecting said first chamber to a supply of gas under pressure which is combustible in the presence of hydrocarbon vapors and said second chamber to a supply of gas under pressure which is relatively inert, an electrical resistance element in each of said chambers responsive to the temperature thereof, means including a bridge circuit for energizing said resistance elements to initiate combustion in one of said chambers and to provide a differential indication of the temperatures in said chambers, and means for reversing the connection of said resistance elements with said bridge circuit means in synchronism with reversals of said gas supply connecting means to reduce zero drift in the temperature indications.

11. In well logging apparatus, a housing adapted to be lowered into a well containing drilling liquid, said housing having a first and a second bell chamber each open at the bottom, means for introducing a gas into said first chamber which is combustible in the presence of hydrocarbon vapors, means for introducing into said second chamber a gas which is relatively noncombustible in the presence of hydrocarbon vapors, means associated with said gas introducing means for regulating the level of well drilling liquid in said chambers, said gases having substantially the same thermal conductivity, and means responsive to the difference in temperatures in said chambers for indicating the presence of hydrocarbons in the drilling liquid.

12. In well logging apparatus, a housing adapted to be lowered into a well containing drilling liquid, said housing having a first and a second bell chamber open at the bottom to receive drilling liquid therebeneath, means for introducing a gas which is combustible when mixed with hydrocarbon vapors into said first chamber, means for introducing into said second chamber a relatively non-combustible gas, means for controlling said gas introducing means to regulate the level of drilling liquid in said chambers, substantially identical electrical resistors disposed respectively in said chambers above the level of said drilling liquid, means for passing current through said resistors in series to heat the same to a temperature sufficient to initiate combustion in said first chamber in the presence of hydrocarbon vapors, means for detecting the difference in resistance values for said resistors resulting from any combustion in said first chamber, and means for recording the presence and amount of hydrocarbon vapors in said first chamber in response to said detecting means as a function of depth of said housing in the well.

13. A method of detecting the boundaries of gas producing formations within a well containing drilling liquid, comprising the steps of moving a pressurized chamber open to the drilling liquid through the well, and detecting the presence of hydrocarbons evolved from the drilling liquid into the chamber.

14. A method of detecting the boundaries of gas producing formations within a well containing drilling liquid, comprising the steps of moving a pressurized chamber open to the drilling liquid through the well, detecting the presence of hydrocarbons evolved from the drilling liquid into the chamber, and recording the presence of the hydrocarbons as a function of the depth of the chamber in the well.

15. A method of detecting the boundaries of gas producing formations within a well containing drilling liquid, comprising the steps of moving a pair of chambers open to the drilling liquid through the well, pressurizing one of said chambers with a gas which supports combustion when mixed with hydrocarbons, pressurizing the other of said chambers with a relatively inert gas, heating said chambers above the ignition temperature for said gas which supports combustion, and detecting any difference in the temperatures of said chambers.

16. A method of detecting the boundaries of gas producing formations within a well containing drilling liquid, comprising the steps of moving a pair of chambers through a well to receive successive portions of drilling liquid beneath said chambers, pressurizing said chambers with gases to maintain the liquid level therein, one of said gases having the ability to support combustion in the presence of hydrocarbon vapors, the other of said gases being relatively inert, periodically reversing the composition of the gases in said chambers, maintaining a temperature in each of said chambers sufficient to initiate combustion of hydrocarbon vapors only in the chamber containing the gas having the ability to support combustion, detecting any difference in temperatures of said chambers, and recording any such difference in temperatures as a function of the depth of said chambers in the well.

References Cited in the file of this patent

UNITED STATES PATENTS

| | | |
|---|---|---|
| 2,222,829 | Humason | Nov. 26, 1940 |
| 2,334,475 | Claudet | Nov. 16, 1943 |
| 2,335,032 | Sullivan | Nov. 23, 1943 |
| 2,399,965 | Weber | May 7, 1946 |
| 2,639,978 | Zaikowsky | May 26, 1953 |
| 2,649,715 | Goble | Aug. 25, 1953 |
| 2,713,010 | Bonner | July 12, 1955 |